WILLIAM B. GOODALE
INVENTOR

BY John R. Faulkner
Robert E. McCollum
ATTORNEYS

United States Patent Office 3,246,471
Patented Apr. 19, 1966

1

3,246,471
HYDRAULIC DRIVE CONTROL
William B. Goodale, Orchard Lake, Mich., assignor to Ford Motor Company, Dearborn, Mich., a corporation of Delaware
Filed Dec. 10, 1964, Ser. No. 417,346
7 Claims. (Cl. 60—52)

This invention relates in general to a fluid pressure control. More particularly, it relates to a control for a pair of fluid interconnected hydraulic drive units to maintain one of the units at a regulated speed regardless of the speed of the other or the engine.

One of the objects of the invention is to provide a fluid pressure control for use in a hydraulic drive consisting of a variable displacement pump and a fixed displacement motor that are fluid connected in a closed circuit, the control maintaining a regulated speed of the motor by automatically controlling the displacement of the pump unit.

Another object of the invention is to provide a control for a hydrostatic drive having pump and motor units that are fluid connected in a closed circuit by high pressure discharge and low pressure return lines; in which the speed of the motor is maintained at a predetermined level by low pressure line fluid automatically varying the stroke of the pump; whereby a sudden loss of pressure in the low pressure line automatically effects a stroking of the pump displacement control to a minimum displacement position to protect the pump from damage.

A further object of the invention is to provide a control for a hydrostatic drive wherein means that is selectively operably at will can effect a stroking of the pump to a minimum displacement position at any time, and independently of any other controls.

A still further object of the invention is to provide a hydrostatic drive having a variable displacement pump and a fixed displacement motor, and fluid pressure control means to automatically vary the displacement of the pump to maintain the motor at a fixed speed; wherein the pump displacement is varied by actuating its displacement control by supercharge fluid under pressure that in turn is controlled by a flow regulating valve and a selectively operable cutoff valve in a manner such that loss of supercharge pressure or movement of the selectively operable valve will automatically condition the pump for a minimum displacement.

Figure 1:
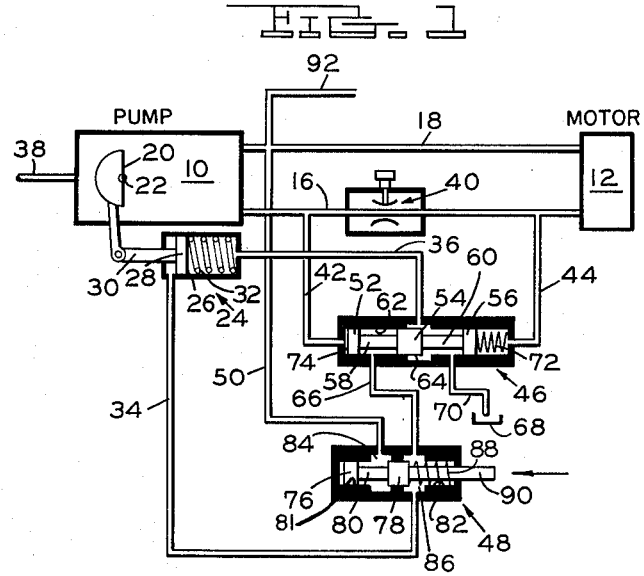
Figure 2:
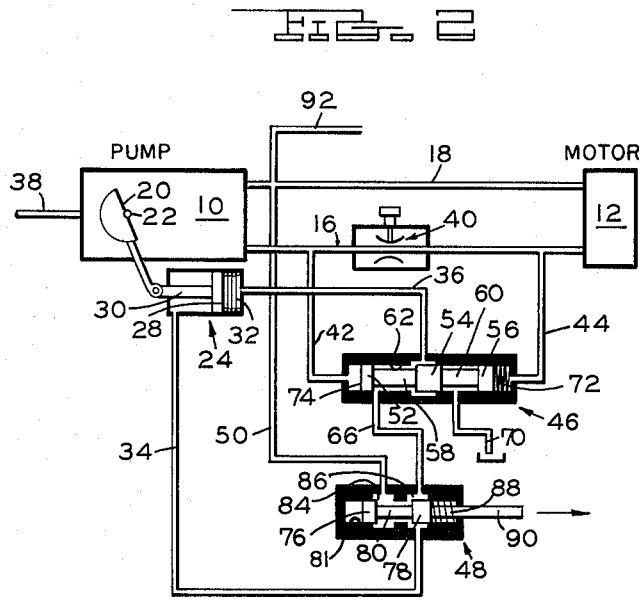

Other objects, features and advantages of the invention will become apparent upon reference to the succeeding, detailed description thereof, and to the drawings illustrating a preferred embodiment thereof; wherein, FIGURES 1 and 2 schematically illustrate a hydrostatic drive having a fluid pressure control system embodying the invention, the figures illustrating different positions of the control parts during different conditions of operation.

FIGURE 1 shows a hydrostatic drive consisting of a variable displacement hydrostatic pump 10 and a fixed displacement hydrostatic motor 12. These units can be of a known type, and the specifis details of construction, therefore, are not given.

The pump and motor units 10 and 12 are connected in a closed fluid circuit for the drive of one by the other by a high pressure fluid discharge line 16 connecting the output of pump 10 to the inlet of motor 12, and a low pressure or supercharge return line 18 connecting the output of motor 12 to the low pressure inlet side of pump 10. The pump and motor in this case are of the swash plate type.

Pump 10 has a swash plate 20 that is adapted to be progressively tilted about a pivot 22 by a hydraulic servo 24 from the zero or minimum fluid displacement position

2 shown in FIGURE 1 to a maximum fluid displacement positions shown in FIGURE 2. The swash plate 20 would bear against a number of circumferentially spaced, axially reciprocable plungers operating in fixed volume cylinder bores so that rotation of the pump by an engine output shaft 38 would cause fluid to be discharged through line 16 into the inlet of motor 12. Tilting swash plate 20 controls the displacements of the plungers in a known manner.

The servo 24 for tilting swash plate 20 comprises a cylinder 26 having a piston 28 slidable therein to move a piston rod 30 pivotally connected to swash plate 20. A spring 32 biases piston 28 to one end of the cylinder to condition the pump for its zero or minimum fluid displacement. The swash plate is moved progressively to a maximum pump fluid displacement position by admitting fluid under pressure to one end of the cylinder through a line 34, and controlling this movement by metering fluid under pressure to the opposite end of the cylinder through a line 36.

As stated previously, a primary object of the invention is to maintain a regulated speed of motor 12 regardless of the speeds of pump 10 and the engine. The invention accomplishes this by a simple control consisting in part of an adjustable flow restricting orifice 40 in pump discharge line 16. The orifice provides differential pressure signals through two lines 42 and 44 connected to act on the ends of a flow control valve 46. Valve 46 in turn regulates the flow of actuating fluid under pressure through line 36 to servo 24.

The control also includes a selectively operable on-off valve 48 that is positioned to control a line 50 supplying fluid under pressure to both lines 34 and 36. When valve 48 is in its fluid blocking position shown in FIGURE 1, spring 32 of servo 24 automatically strokes the piston 28 to move swash plate 20 to a minimum fluid displacement position; valve 48 can be moved to this position at any time, and independently of flow control valve 46. By controlling the stroking of the pump by valves 46 and 48, any loss of pressure in line 50, or movement of valve 48 to block flow, terminates the fluid pressure actuating forces on piston 28 and thereby permits it to stroke the pump swash plate to a minimum fluid displacement position.

More specifically, valve 46 is a fluid pressure regulating valve. It is a spool type valve having three spaced lands 52, 54 and 56 connected by neck portions 58 and 60 of reduced diameter. The valve is slidable within a bore 62 of a valve body connected at opposite ends to lines 42 and 44. The bore has a central annular fluid chamber 64 connected to servo line 36, and the movement of the valve variably connects line 36 to a supply line 66, or to a sump 68 through a vent or exhaust line 70. Valve 46 is biased by a spring 72 against a stop 74 to the non-regulating position shown in FIGURE 1. It is moved to its regulating positions shown in FIGURE 2 by the differential pressure forces of the fluid in lines 42 and 44.

The supply of fluid under pressure to line 66 is controlled by selectively operable valve 48. This latter valve is also a spool type having spaced lands 76 and 78 connected by a neck portion 80 of reduced diameter. The valve is slidably mounted in a bore 81 of a valve body. The valve body has one annular chamber 84 connected to fluid supply line 50, and is spaced from a second annular chamber 86 connected to lines 66 and 34. The ends of bore 81 are open to exhaust. Valve 48 is biased by a spring 88 to the fluid flow blocking position shown in FIGURE 1. The valve can be moved, by any suitable means not shown acting on stem 90, to the position shown in FIGURE 2. In this position, the valve connects line 50 to lines 66 and 34, and, if valve 46 is closed, causes piston 28 to be moved to the right against the action of spring 32 to stroke swash plate 20 towards the pump maximum fluid displacement position.

Line 50 is shown as being a branch of the low pressure line 18, and is, therefore, at supercharge pressure. A make-up pump, not shown, is generally provided to add to the system whatever additional fluid is needed to make up for that lost by leakage. The discharge from this pump would deliver fluid into a line 92. It will be clear, however, that line 50 could be supplied with fluid from any suitable separate external source.

In over-all operation, with the engine stopped, the parts will be in the positions shown in FIGURE 1. Control valve 48 is in its off position blocking any flow of supercharge fluid under pressure to lines 34 and 66 (and therefore 36), and venting any fluid in these lines to exhaust out through the open right end of the valve body. Piston 28 is thus biased to the zero pump displacement position. This reduces the load on the engine during starting. Once the engine is started, valve 48 is moved to its on or flow unblocking position indicated in FIGURE 2. In this position, it permits supercharge fluid under pressure to flow through the valve into line 34 and act against the left hand side of piston 28. The pressure at this time is sufficient to overcome the force of spring 32 and move the piston to tilt swash plate 20 to the maximum pump displacement position shown in FIGURE 2.

As pump 10 rotates, the fluid discharged through line 16 passes through line 42 and orifice 40, which creates a pressure drop across it so that a pressure differential exists in lines 42 and 44. With motor 12 stationary, the pressure in line 44 begins building up toward a level sufficient to begin to rotate it. The pressure in line 44, therefore, in combination with the force of spring 72 is sufficient at this time to maintain valve 46 in the position shown in FIGURE 1 against the pump discharge pressure in line 42. As soon as motor 12 begins to rotate, the pressure in line 44 begins to drop.

The force of spring 72 and the areas of the valve lands are chosen such that when motor 12 reaches the desired regulated speed, the pressure in line 44 plus the force of spring 72 will equal the pressure of the pump discharge fluid in line 42. Any further increase in the differential pressures in lines 42 and 44 caused by an increase in the speed of motor 12 thereby causes the flow control valve 46 to move slightly to the right from that shown in FIGURE 1 to crack open communication between lines 66 and 36. A small amount of supercharge fluid under pressure will then flow through line 36 to the right hand side of piston 28 and move it to the left by a small amount to begin to decrease the displacement of pump 10. The output in lines 16 and 42 will, therefore, begin to decrease. This progressive decrease of the pump displacement will continue until the pressure differential between lines 42 and 44 is at the right value to maintain the motor at its regulated speed.

If the displacement of pump 10 should now decrease to a point where the flow is not sufficient to maintain the motor at its regulated speed, the decrease in the pressure differential between lines 42 and 44 will accordingly cause control valve 46 to be moved to the left to decrease or totally shut off the flow from line 66 to line 36 and increase the pump displacement. The flow control valve, therefore, during these operations will move back and forth until it attains an equilibrium position whereby sufficient supercharge pressure is regulated to the opposite sides of piston 28 to maintain pump 10 at a displacement that will maintain the motor 12 at its regulated speed.

If at any time during the operation, the supercharge pressure should suddenly decrease, indicating a failure in the system, the pressure on opposite sides of piston 28 will decay and permit spring 32 to stroke swash plate 20 to a pump zero displacement position. This protects the pump at all speeds, and particularly during high speed operation.

If for any reason, such as an excessive build-up in load on the system, it is desired to neutralize the drive or relieve the load on pump 10, control valve 48 can be moved to its off position illustrated in FIGURE 1. This immediately blocks the flow of supercharge pressure from line 50 to flow control valve 46 and to both sides of piston 28, thereby permitting spring 32 to tilt swash plate 20 to a zero pump displacement position.

From the foregoing, it will be seen that the invention provides a simplified control system for a hydrostatic drive that maintains a regulated speed of the motor regardless of the pump and engine speeds. It will also be seen that the system automatically conditions the pump for a minimum fluid displacement in the event of a fluid failure in the system, and that the pump can be stroked to a zero displacement at any time independently of the other controls simply by actuating the control valve 48 to discontinue the supply of actuating fluid pressure to the swash plate control piston 28.

While the invention has been illustrated in its preferred embodiment in the figures, it will be clear to those skilled in the arts to which the invention pertains that many changes and modifications may be made thereto without departing from the scope of the invention.

I claim:

1. A control circuit for a hydraulic transmission having a first variable displacement hydraulic unit and a second fixed displacement hydraulic unit fluid connected in a closed circuit by a high pressure discharge line from said first unit to said second unit and a supercharge pressure return line for the drive of one of said units by the other, control means to vary the displacement of said first unit from a minimum to a maximum, means biasing said latter means to a minimum displaceent position, and control means operably connected to said first unit control means for automatically varying the displacement of said first unit to provide a constant speed of said second unit, said latter control means including a flow restricting means in the fluid discharge line from said first unit to the inlet to said second unit, conduit means connecting the fluid at the pressure in one of said lines to opposite portions of said first unit control means for reciprocating said control means in opposite directions to vary the displacement of said first unit, and means in the said conduit means to one of said portions movable to regulate the supply of fluid pressure to said one portion and thereby regulate the displacement of said first unit, and fluid pressure conduits connecting the fluid on opposite sides of said flow restricting means to opposite portions of said first unit control meanss for variably moving it to regulating positions in response to the pressure differential across said flow restricting means to thereby control the displacement of said first unit, a failure in pressure of said one line automatically conditioning said first unit for a minimum fluid displacement.

2. A control circuit for a hydraulic transmission having a variable displacement hydraulic pump unit and fixed displacement hydraulic motor unit fluid connected in a closed circuit by a high pressure discharge line from said pump to said motor and a supercharge pressure return line for the drive of one of said units by the other, control means to vary the displacement of said pump from a minimum to a maximum, means biasing said latter means to a minimum displacement position, and fluid pressure control means operably connected to said pump and pump control means for automatically varying the displacement of said said pump to provide a constant speed of said motor, said latter control means including a flow restricting means in the fluid discharge line from said pump to the inlet to said motor, conduit means connecting the fluid at supercharge pressure to opposite portions of said pump control means for reciprocating said control means in opposite directions to vary the displacement of said pump, and a regulating valve in the said conduit means to one of said portions movable to regulate the supply of supercharge pressure to said one portion and thereby regulate the displacement of said pump, and fluid pressure lines connecting the fluid on opposite sides of said flow restricting means to opposite portions of said control means for variably moving it between its positions in response to the pressure differential across said flow restricting means to thereby control the displacement of said pump, a failure in the supercharge pressure line automatically conditioning said pump for a minimum fluid displacement.

3. A control system for a hydraulic transmission having a variable displacement hydraulic pump unit and a hydraulic motor unit fluid connected in a closed circuit for the drive of one of said units by the other, fluid pressure operated pump control means to vary the displacement of said pump from zero to a maximum, means biasing said latter means to a zero displacement position, and fluid pressure control means operably connected to said pump and pump control means for automatically varying the displacement of said pump to provide a constant speed of said motor, said latter control means including a flow restricting means in the fluid line connecting the discharge from said pump to the inlet to said motor, a source of fluid under pressure, conduit means connecting said source to opposite portions of said pump control means for reciprocating said control means in opposite directions to vary the displacement of said pump, and control means in said conduit means for controlling the supply of said fluid under pressure to said pump control means, said control means being movable between open and closed positions to admit or block flow of said fluid under pressure to said one portion of said pump control means, and conduit means connecting the pump discharge line fluid on opposite sides of said flow restricting means to opposite portions of said control means for variably moving it between its positions in response to a predetermined pressure differential across said flow restricting means to thereby control the displacement of said pump, a failure of said source to supply fluid causing said biasing means to move said pump control means to a pump zero fluid displacement position.

4. A control circuit as in claim 1, including additional means in said conduit means connected to opposite portions of said first unit control means, said additional means being operable at will and selectively movable between positions blocking and unblocking flow through the conduit means, the movement of said latter means to a blocking position conditioning said first unit for a zero displacement.

5. A control circuit for a hydrostatic transmission having a variable displacement hydrostatic pump unit and fixed displacement hydrostatic motor unit fluid connected in a closed circuit by a high pressure discharge line from said pump to said motor and a supercharge pressure return line for the drive of one of said units by the other, fluid pressure actuated control means to vary the displacement of said pump from a minimum to a maximum, means biasing said latter means to a minimum displacement position, and fluid pressure control means operably connected to said pump and pump control means for automatically varying the displacement of said pump to provide a constant speed of said motor, said latter control means including a flow restricting orifice in the fluid discharge line from said pump to the inlet to said motor, conduit means connecting the fluid at supercharge pressure to opposite portions of said pump control means for reciprocating said control means in opposite directions to vary the displacement of said pump, a regulating valve in said conduit means to one of said portions movable to regulate the supply of supercharge pressure to said one portion and thereby regulate the displacement of said pump, and fluid pressure lines connected to opposite sides of said orifice and to opposite portions of said control means for variably moving it between its positions in response to the pressure differential across said orifice to thereby control the displacement of said pump, a failure in the supercharge pressure line automatically conditioning said pump for a minimum fluid displacement.

6. A control circuit as in claim 5, including means selectively movable at will into and out of the conduit means connecting supercharge pressure to said pump control means to block or unblock flow of fluid therethrough, the movement of said selectively movable means to a fluid flow blocking position effecting movement of said pump control means to a minimum displacement position.

7. A control circuit for a hydrostatic transmission having a variable displacement hydrostatic pump unit and a fixed displacement hydrostatic motor unit fluid connected in a closed circuit by a high pressure discharge line from said pump to said motor and a supercharge pressure return line for the drive of one of said units by the other, fluid pressure operated piston means to vary the displacement of said pump from a minimum to a maximum, spring means biasing said latter means to a minimum displacement position, and fluid pressure controlling means operably connected to said pump and piston means for automatically varying the displacement of said pump to provide a constant speed of said motor, said latter control means including a flow restricting orifice in the fluid discharge line from said pump to the inlet to said motor, conduit means connecting the fluid at supercharge pressure to opposite sides of said piston means for reciprocating it in opposite directions to vary the displacement of said pump, a fluid pressure regulating valve in the conduit means connected to one side of said piston means and movable to regulate the supply of supercharge pressure to said one side and thereby regulate the displacement of said pump, means biasing said valve to a non-regulating position, and fluid pressure lines connecting the fluid on opposite sides of said orifice to opposite portions of said valve for variably moving it between its regulating and non-regulating positions in response to the pressure differential across said orifice to thereby control the movement of said piston means and control the displacement of said pump, a failure in the supercharge pressure line automatically conditioning said pump for a minimum displacement by permitting said spring means to move said piston means to the minimum pump displacement position, and a second valve in said conduit means to also control the displacement of said pump, said second valve being movable at will into the conduit means supplying fluid to opposite sides of said pump means to block the same and thereby condition said pump for a minimum fluid displacement.

References Cited by the Examiner

UNITED STATES PATENTS

| 2,238,061 | 4/1941 | Kendrick | 60—52 |
| 3,168,295 | 2/1965 | Dorrell et al. | 60—19 X |

References Cited by the Applicant

UNITED STATES PATENTS

| 2,291,001 | 7/1942 | Vickers. |
| 2,381,795 | 7/1945 | Willett. |
| 2,472,477 | 6/1949 | Harrington et al. |
| 2,630,681 | 3/1953 | Ferris. |
| 2,838,908 | 6/1958 | Forster. |
| 3,054,263 | 9/1962 | Budzich et al. |
| 3,058,297 | 10/1962 | Tolley. |

EDGAR W. GEOGHEGAN, *Primary Examiner.*